United States Patent [19]
Busse

[11] Patent Number: 4,641,847
[45] Date of Patent: Feb. 10, 1987

[54] SINGLE LEVER CONTROL WHEEL CHAIR

[76] Inventor: Ronald E. Busse, 1902 Peach St., Erie, Pa. 16502

[21] Appl. No.: 809,028

[22] Filed: Dec. 16, 1985

[51] Int. Cl.[4] B60K 3/00

[52] U.S. Cl. 280/242 WC; 280/3; 280/240; 280/282

[58] Field of Search 280/242 WC, 240, 243, 280/282, 3

[56] References Cited

U.S. PATENT DOCUMENTS

| | | | |
|---|---|---|---|
| 2,649,309 | 8/1953 | Deissner | 280/242 WC |
| 2,814,505 | 11/1957 | Kelly | 280/3 |
| 3,381,973 | 5/1968 | Carr | 280/242 WC |
| 3,921,744 | 11/1975 | Bonoit et al. | 280/242 WC |
| 4,227,706 | 10/1980 | Morris | 280/3 |

*Primary Examiner*—John J. Love
*Assistant Examiner*—Donn McGiehan
*Attorney, Agent, or Firm*—Charles L. Lovercheck; Wayne L. Lovercheck; Dale R. Lovercheck

[57] ABSTRACT

A wheel chair including a frame, at least three wheels, a drive mechanism and a single lever control mechanism. The drive mechanism includes a prime mover mechanism and a selective engagement mechanism. The frame is supported by the wheels. The single lever control mechanism is connected to the selective engagement mechanism. The selective engagement mechanism is connected to the prime mover mechanism. The selective engagement mechanism is adapted to selectively transfer power from the prime mover mechanism into forward and reverse movement of at least one of the wheels of the wheel chair.

9 Claims, 9 Drawing Figures

SINGLE LEVER CONTROL WHEEL CHAIR

BACKGROUND OF THE INVENTION

The invention relates to wheel chairs. The invention provides an improved apparatus for occupant control of wheel chair propulsion. The improvements of the invention each taken alone or in combination add to resolve the problems of the prior art.

Otto in U.S. Pat. No. 4,322,093 discloses a wheeled walking aid with seat and hand brake. Otto's walking aid does not provide a drive mechanism.

Schaeffer in U.S. Pat. No. 3,944,509 discloses a propulsion means for wheel chairs which requires two drive assemblies.

Lucken in U.S. Pat. No. 4,453,729 discloses an occupant propellable wheel chair, which like Schaeffer requires two drive assemblies.

Dews in U.S. Pat. No. 834,368 and Trullinger in U.S. Pat. No. 1,620,926 each discloses a hand operated wagon.

Davis in U.S. Pat. No. 1,154,616 and Sink in U.S. Pat. No. 3,895,825 each disclose a hand operated two wheeled vehicle.

Lorbeski in U.S. Pat. No. 2,135,347; Saxton in U.S. Pat. No. 413,104; Welch in U.S. Pat. No. 2,732,221 and Steel in U.S. Pat. No. 504,685 each discloses a hand operated front wheel driven vehicle.

A deficiency of the prior art is the lack of a single lever and mechanism to control the magnitude and direction of propulsion of a wheel chair.

Another deficiency of the prior art is the lack of a conveniently stowable wheel chair. The improvements of the present invention beneficially provide a folding wheel chair having a single lever and mechanism to control the magnitude and direction of propulsion.

BRIEF DESCRIPTION OF THE INVENTION

These problems of the prior art are overcome by the improved single lever control wheel chair of the present invention. The improved single lever control wheel chair of the present invention provides control for the magnitude and direction of the propulsion in a single lever. The wheel chair is adapted to be operated using the single lever control mechanism to control the forward, reverse and turning of the wheel chair by moving the single lever control mechanism.

The improved wheel chair of the invention includes a frame, at least three wheels, a drive mechanism and a single lever control mechanism. The drive mechanism includes a prime mover mechanism and a selective engagement mechanism. The frame is supported by the wheels. The single lever control mechanism is connected to the selective engagement mechanism. The selective engagement is connected to the prime mover mechanism. The selective engagement mechanism is adapted to selectively transfer power from the prime mover mechanism into forward and reverse movement of at least one of the wheels of the wheel chair.

BRIEF DESCRIPTION OF THE DRAWINGS

The objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 2:
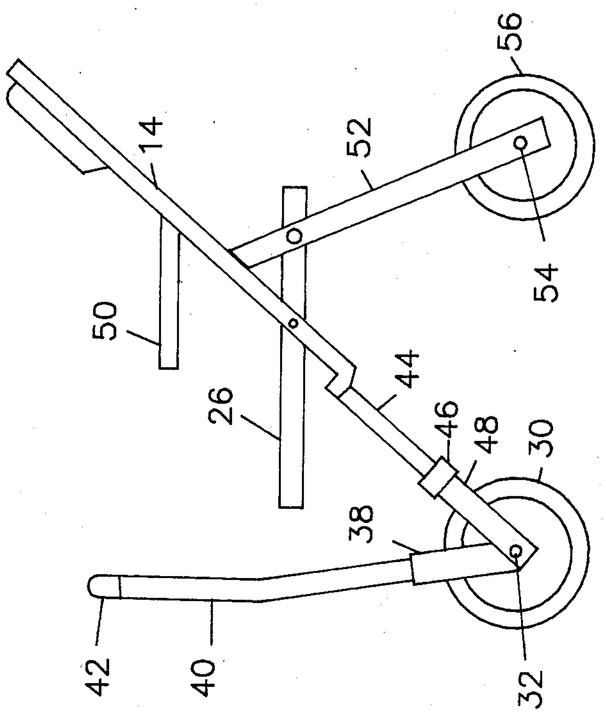
FIG. 2 is a side view of the folding single lever control wheel chair shown in FIG. 1.
Figure 1:
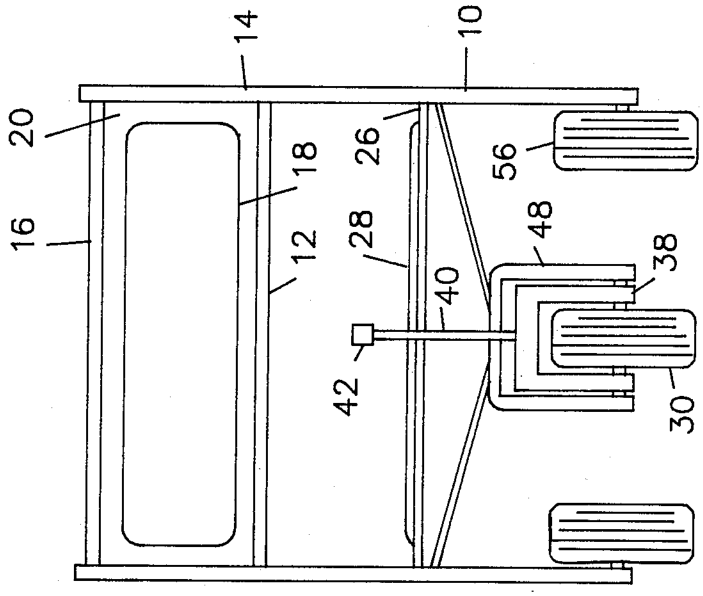
FIG. 1 is a front view of a folding single lever control wheel chair in accordance with the invention.

The preferred embodiments of the invention are illustrated by way of example in FIGS. 1-9. Referring to the figures, in which like numerals refer to like portions thereof, FIGS. 1 and 2 show a folding wheel chair 10 in accordance with the present invention. The folding wheel chair 10 includes a lower transverse member 12 connected to side member 14 and upper transverse member 16 connected to side member 14. The back cushion 18 is supported by back plate member 20. Seat body member 26 supports seat cushion 28. Front wheel 30 is supported by front axle 32. Control arm mount 38 supports control arm 40. Control arm 40 supports control handle 42. The chair side member 14 is supported by cross support 44. Cross support 44 is supported by front wheel mount transverse member 46. Front wheel rotatable transverse member 46 is supported by front wheel mount side member 48 so that side member 48 can rotate relative to support 44. Arm rest 50 is supported by side member 14. Chair leg 52 is supported by rear axle 54. Rear wheel 56 is supported by rear wheel axle 54. Seat body member 26 is pivotally connected to side member 14. Seat body member 26 is pivotally connected to chair leg 52. The control arm 40 is intended to be moved forwardly and rearwardly moving a ratchet arrangement in the front wheel 30 to rotate wheel 30 on axle 32. The lever may be moved from side to side to steer wheel 30. The control arm is rotated to shift the wheel 30 for forward, rearward and stop according to the chart shown in FIGS. 8 and 9. Side members 14 are supported by chair legs 52.

This chair 10 can be propelled and steered by means of a single lever twisting it to control direction of the ratchet drive, rocking it from side to side to steer and twisting handle 42 to right or left to control the drive stroke of the ratchet in control arm mount 38.

Figure 4:
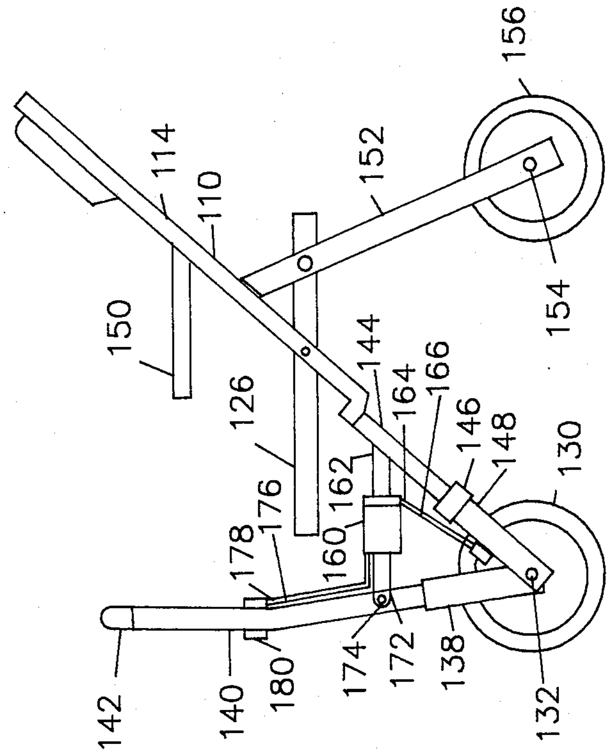
FIG. 4 is a side view of another embodiment of the folding single lever control wheel chair in accordance with the invention.
Figure 3:
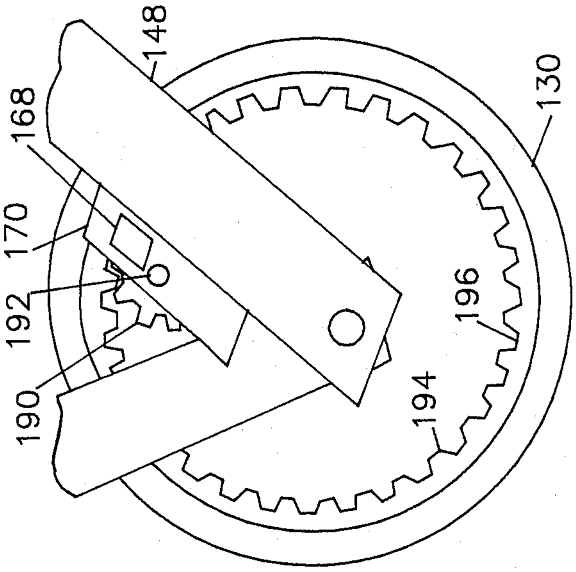
FIG. 3 is a partial side view of one embodiment of a folding single lever control wheel chair in combination with a sprocket drive mechanism in accordance with the invention.

With more particular reference to FIGS. 3 and 4, a folding wheel chair 110 is seen in accordance with the present invention. The folding wheel chair 110 includes a side member 114 which supports seat body member 126. Front wheel 130 is supported by front axle 132. Control lever mount 138 supports control lever 140. Control lever 140 supports control handle 142. The chair side member 114 is supported by cross support 144. Cross support 144 is supported by front wheel mount transverse member 146. Front wheel mount transverse member 146 is rotatably supported by front wheel mount side member 148. Thus side member 148 can rotate relative to cross support 144. Arm rest 150 is supported by side member 114. Chair leg 152 is supported by rear axle 154. Rear wheel 156 is supported by rear axle 154.

Drive energy source 160, may be a hydraulic pump, an electric switch connected to a battery or an air valve, is supported by chair support 162. Drive energy source 160 is connected by connector lines 164 and 166 to motor 168. Motor 168 is supported by motor mount 170. Motor mount 170 is supported by front wheel mount side member 148 and connected to wheel 130 by suitable mechanism familiar to those skilled in the art. Drive energy source 160 is supported by control arm support 172. Control arm support 172 is connected to control lever 140 by pin 174. Drive energy source 160 is connected by connector lines 176 and 178 to control mechanism 180. Control mechanism 180 may be a throttling arrangement to control the speed of the drive wheel or any other suitable arrangement.

An occupant of the chair can set the forward or rearward direction of the chair by rotating control drive 140. Clockwise and counterclockwise this will set the ratchet as a mechanic sets the direction of a ratchet on a wrench, for example. He can rock the arm 140 forward and back to propel the chair in accordance with the ratchet setting and steer by rocking the lever 140 to right or left to steer the chair.

With more particular reference to FIG. 3, it is seen that sprocket 190 is supported by sprocket axle 192. The teeth of sprocket 190 mesh with the ring gear teeth 194 of ring gear 196. Ring gear 196 is supported by front wheel 130.

Figure 6:
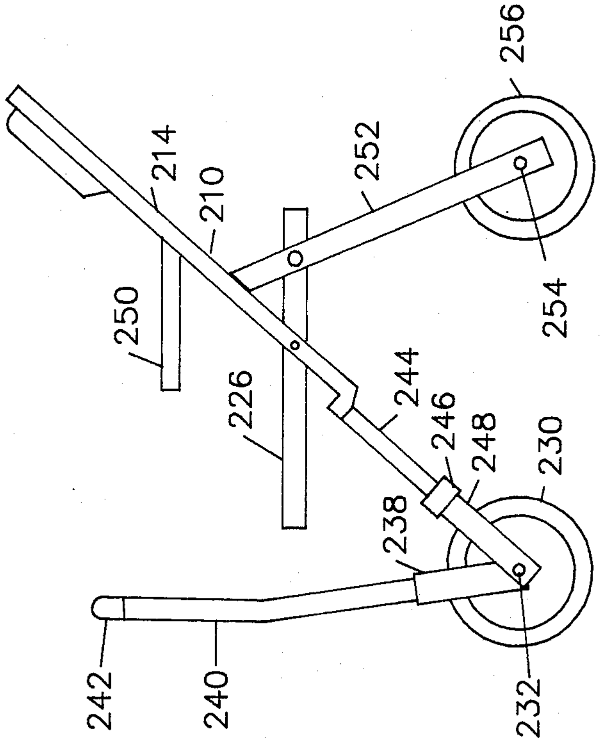
FIG. 6 is a side view of a rachet drive mechanism for a folding single lever control wheel chair in accordance with the invention.
Figure 5:
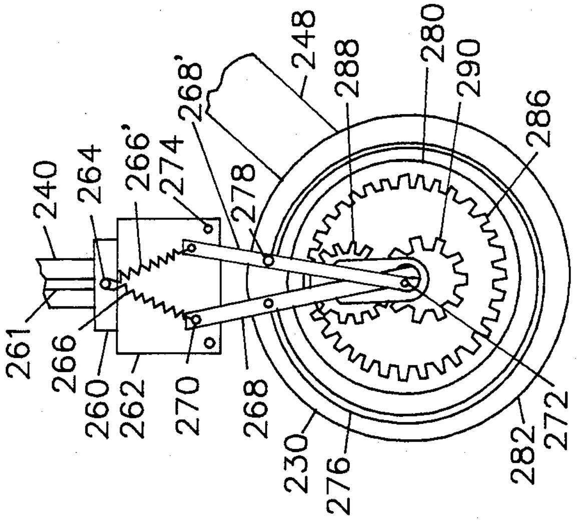
FIG. 5 is a partial side view of yet another embodiment of a folding single lever control wheel chair in combination with a rachet drive mechanism in accordance with the invention.

With more particular reference to FIGS. 5 and 6, a folding wheel chair 210 is seen in accordance with the present invention. The folding wheel chair 210 includes a side member 214 which supports seat body member 226. Front wheel 230 is supported by front wheel axle 232. Control lever mount 238 supports control lever 240. Control arm 240 supports control handle 242. The chair side member 214 is supported by cross support 244. Cross support 244 rotatably supports front wheel mount transverse member 248 through joint 246 allows front wheel mount transverse member 248 to rotate relative to cross support 244. Arm rest 250 is supported by side member 214. Chair leg 252 is supported by rear axle 254. Rear wheel 256 is supported by rear wheel axle 254.

The control lever 240 is supported by the pin mount 260 and the stop mount 262. The position of pin 264 controls the forward and reverse motion. Pin 264 is actuated through connector 261 by rotation of the control handle 242. Tension springs 266 and 266′ are connected from pin 264 to rachet drive links 268 and 268′ at apertures 270. The rachet drive links 268 pivot at band rod pivot 272. The movement of rachet drive links 268 is limited by stop pins 274. Drive band 276 is connected to ratchet drive links 268 by band flanges 278. The drive band 276 is supported adjacent to drum 280. The drum 280 of drive wheel 230 is supported by the tire 282. The drum 280 is connected to ring gear 286. Sun gear 290 is fixed to axle 232. Ring gear 286 drives planetary gear 288. Planetary gear 288 is carried by arm 287.

The drive is through the drum 280. The drum 280 is driven by tightening the drive band 276 around the drum 280 when the stop mount 260 is rotated to the descend position. Tightening and untightening of the drive band 276 gives a ratcheting action and are controlled by the single lever control. The connector 261 connects the control handle 242 to pin mount 260. By rotating the handle as shown in FIG. 8, the band 276 engages the drum 280 for forward or for reverse motion when the handle is subsequently moved for propulsion as shown in FIG. 9.

Figure 7:
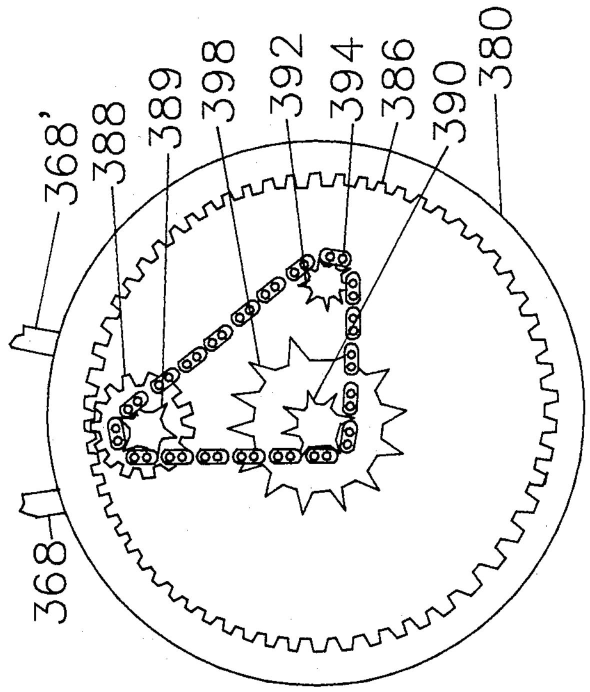
FIG. 7 is a side view of a multiple sprocket drive mechanism for a folding single lever control wheel chair in accordance with the invention.

An alternative to the planetary gear drive mechanism is the multiple sprocket mechanism shown in FIG. 7. The drive is through ratchet drive links 368 and 368′. The drive members 368 and 368′ may be controlled by the single lever control of the tightening and untightening of a drive band around a drum of the type shown in FIGS. 5 and 6. The drum 380 supports gear 386. Gear 386 drives gear 388. Sprocket 389 is supported by gear 388. Sprocket 390 and sprocket 392 are driven by sprocket 389 through drive chain 394. Sprocket 390 and sprocket 398 are connected to the front wheel of the chair. Sprocket 392 is movable so that a derailer mechanism may move the drive chain 394 between sprocket 390 and sprocket 398.

Figure 8:
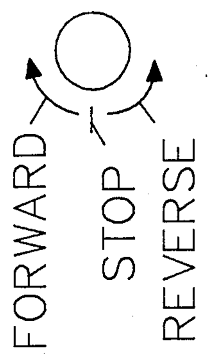
FIG. 8 is a schematic rotational movement of the single element control of a folding wheel chair in accordance with the invention.
Figure 9:
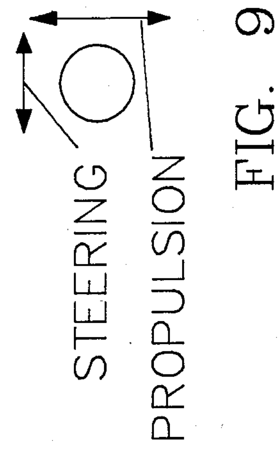
FIG. 9 is a schematic linear movement of the single element control of a folding wheel chair in accordance with the invention.

With more particular reference to FIGS. 8 and 9, the movements of the single element control handle are seen. The forward and backward movement of the control handle provides propulsion in a direction selected by rotation of the handle. Movement of the control handle to the side provides the steering for the chair.

In operation, control of the forward, reverse and turning of the wheel chair is done by moving the single lever control mechanism. Clockwise rotation of the handle from the stop center point sets the drive mechanism for forward motion of the wheel chair. Counterclockwise rotation of the handle from the center point sets the drive mechanism for reverse motion of the wheel chair. Rotation of handle to the center point sets the brake mechanism. For a motor driven embodiment of the invention pushing the handle forward directs the chair forward at a speed proportional to the distance from a neutral center position. Pulling the handle backward from the neutral position directs the chair backward at a speed proportional to the distance from the neutral position. Returning the handle back toward the neutral position reduces the power. In manually driven embodiments of the invention, the handle is preferably pushed forward and/or pulled backward to provide the power for forward and reverse motion. Preferably, steering is directed by moving the handle a distance from a center position to a side. For example, a left turn is preferably started by moving the handle to the right of the center line. Similarly, a right turn is preferably started by moving the handle to the left of the center line.

Preferably, a wheel chair in accordance with the invention includes a frame, at least three wheels, drive mechanism and a single lever control. The frame is supported on the wheels. The drive mecahnism is connected to at least one of the wheels. The single lever control is connected to the drive mechanism. Preferably, the single lever control mechanism includes a rotatable handle portion and a pivotal control arm. Most preferably, a wheel chair in accordance with the invention folds and is provided with a seat and a back. The seat is supported by the frame, and the back is supported by the frame adjacent to the seat. Preferably, the single lever control mechanism extends adjacent to the seat opposite to the back.

In each of the preferred embodiments disclosed herein, the frame includes a first and a second side support member and two cross support members and a front wheel support. Each cross support member is connected to a side support member, and each cross support member is connected to the front wheel support.

Preferably, at least one of the wheels is supported by the front wheel support, and the frame includes a first and a second rear support member. Preferably, the first rear support member is pivotally connected to a first side support member, and the second rear support member is pivotally connected to a second side member, and at least one wheel is supported by each of the rear support members.

Preferably the drive mechanism includes a motor, or a drum and a band where the band extends around the drum, or a drum enclosing a planetary gear system, or a multiple speed sprocket system.

The foregoing specification sets forth the invention in its preferred, practical forms but the structure shown is capable of modification within a range of equivalents without departing from the invention which is to be undertood is broadly novel as is commensurate with the appended claims.

The embodiments of the invention in which an exclusive property or privilege is claimed are defined as follows:

1. A folding chair comprising a frame, rear ground support means on said frame,
 said frame having a downwardly and forwardly extending member,
 a front wheel support,
 a front wheel on said front wheel support,
 manual control means attached to said front wheel support for steering said front wheel to right or left and for driving said front wheel selectively forward and in reverse,
 said manual control means comprising rotatable means rotatably attaching said front wheel support to said downwardly extending member,
 a front wheel propulsion means including ratchet means connecting said front wheel to said front wheel support and to said manual control means,
 said manual control means being swingable to right or left to incline said front wheel support on said downwardly extending frame member to steer said folding chair right or left,
 drive means comprising said manual control means being rotatable about its axis and having means to cause said ratchet to engage said wheel selectively either for forward or for rearwardly motion of said wheel depending on the direction said manual control means is rotated,
 whereby said manual control means rotates said wheel forward or rearward through said ratchet,
 said manual control means being swingable forward and rearward moving said ratchet forward and rearward driving said front wheel forward or rearward in a direction determined by the direction in which said manual control means has been rotated.

2. The folding chair recited in claim 1 wherein said manual control means comprises a hand engageable control handle attached to said manual control means.

3. The folding chair recited in claim 2 wherein said frame means comprises
 a first and a second side support member and two cross support members and a front wheel support means,
 each said cross support member being connected to a side support member, and each said cross support member being connected to said front wheel support means.

4. The folding chair recited in claim 3 wherein said propulsion means comprises
 a clutch means having a first end supported on said lever and a second part supported on said folding chair frame,
 said first part being movable relative to said frame,
 said first part and said second part being movable relative whereby energy is supplied to said propulsion means.

5. The folding chair recited in claim 1 wherein said drive means comprises a motor and said ratchet means comprises means for connecting and disconnecting said wheel.

6. The folding chair recited in claim 1 wherein said front wheel support comprises
 an axle,
 a planetary gear system including a ring gear, a sun gear, a planetary gear and a planetary carrier,
 said planetary carrier having a first end and a second end,
 said first end of said planetary carrier being rotatably supported on said axle,
 said planetary gear being rotatably supported on said second end of said planetary carrier,
 said ring gear being fixed to said wheel and to said drum,
 said first ends of said springs being fixed to said pin mount.

7. The folding chair recited in claim 3 wherein said propulsion means comprises
 a motor connected to said drive wheel,
 means energy supply means supported on said folding chair and actuated by said control lever to drive said propulsion means in a first direction wherein said control means is moved forward.

8. A folding chair comprising a frame and rear ground support means on said frame,
 said frame having a downwardly and forwardly extending member,
 a front wheel support including an axle,
 rotatable means rotatably attaching said front wheel support to said downwardly extending member,
 manual control means attached to said wheel support,
 a front wheel propulsion means including ratchet means connecting said front wheel to said front wheel support,
 said manual control means being adapted to be swung to right or left to incline said front wheel support on said downwardly extending frame member to steer said folding chair right or left,
 said manual control means being adapted to be rotated about its axis and having means to cause said ratchet to engage said wheel selectively either forward or rearwardly depending on the direction said manual control means is rotated, said wheel being driven through said ratchet whereby said manual control means rotates said wheel forward or rearward through said ratchet, said manual control means being adapted to be swung forward and rearward moving said ratchet forward and rearward driving said front wheel forward or rearward in a direction determined by the direction in which said manual control means has been rotated, said front wheel propulsion means comprises a drum attached to said wheel and a band, said band extending around said drum and having a first end and a second end, a ring gear attached to said drum and concentric therewith, a sun gear fixed to said axle, a planetary gear meshing with said sun gear and with said ring gear, a planetary carrier swingably connected to said drum.

9. The folding chair recited in claim 1 wherein said drive means comprises a first link having a first end, an intermediate part, and a second end, a second link having a first end, an intermediate part, and a second end, a band having a first end and a second end, a first spring having a first end and a second end, a second spring having a first end and a second end, said wheel having an axle, said first ends of said links being swingably supported to said axle, said first end of said band being connected to said intermediate parts of said first link, said second end of said band being connected to said second link, said first end of said first spring being connected to said second end of said first link, said first end of said second spring being connected to said second end of said second link, a pin mount on said manual control means, a pin on said pin mount, said pin being attached to said second end of said first spring and to said second end of said second spring, a stop mount on said control means being connected to said pin mount, spaced stops comprising a first stop and a second stop on said stop mount, a drum on said wheel, said first link being adapted to engage said first stop when said manual control means is moved forward whereby said band binds on said drum whereby said manual control means is rotated in a first direction whereby said wheel is rotated forward, said second link being adapted to engage said second stop when said stop mount is rotated in a second direction whereby said wheel is rotated rearward.

* * * * *